US012651717B2

(12) United States Patent
Ao et al.

(10) Patent No.: US 12,651,717 B2
(45) Date of Patent: Jun. 9, 2026

(54) CLOSED-TYPE TEMPERATURE CONTROL DEVICE

(71) Applicant: AuOne Electronic Manufacturing Limited, Foshan (CN)

(72) Inventors: Chi Man Ao, Foshan (CN); Ka Seng Ao, Foshan (CN); Hehua Li, Foshan (CN); Ziheng Chen, Foshan (CN); Runeng Chen, Foshan (CN)

(73) Assignee: AuOne Electronic Manufacturing Limited, Guangdong (CN)

( * ) Notice: Subject to any disclaimer, the term of this patent is extended or adjusted under 35 U.S.C. 154(b) by 235 days.

(21) Appl. No.: 18/617,607

(22) Filed: Mar. 26, 2024

(65) Prior Publication Data

US 2025/0246384 A1 Jul. 31, 2025

(30) Foreign Application Priority Data

Jan. 26, 2024 (CN) ......................... 202410107832.7

(51) Int. Cl.
*H01H 37/52* (2006.01)
*H01H 37/04* (2006.01)

(52) U.S. Cl.
CPC ............ *H01H 37/52* (2013.01); *H01H 37/04* (2013.01)

(58) Field of Classification Search
CPC ........... H01H 37/04–043; H01H 37/52; H01H 37/54–5436; H01H 2037/5445–549; H01H 37/60
See application file for complete search history.

(56) References Cited

U.S. PATENT DOCUMENTS

| | | | | |
|---|---|---|---|---|
| 4,495,481 A * | 1/1985 | Hickling | H01H 37/10 | 337/349 |
| 4,825,186 A * | 4/1989 | Bayer | H01H 37/22 | 337/354 |
| 4,843,364 A * | 6/1989 | Place | H01H 1/5866 | 337/380 |
| 5,973,586 A * | 10/1999 | Mertler, Jr. | H01H 37/02 | 337/299 |
| 2013/0106563 A1* | 5/2013 | Yang | H01H 9/10 | 337/143 |

FOREIGN PATENT DOCUMENTS

| | | |
|---|---|---|
| CN | 103337410 A | 10/2013 |
| CN | 211045340 U * | 7/2020 |

OTHER PUBLICATIONS

Li CN211045340U Description.*

* cited by examiner

*Primary Examiner* — Jacob R Crum

(57) ABSTRACT

A closed-type temperature control device includes a ceramic box and a base; the base adopts a cavity structure provided with an opening, the base is fixedly connected to the ceramic box, and a guide hole is provided between the base and the ceramic box; a temperature sensing piece is arranged in the base, an action mechanism is arranged in the ceramic box, an action rod connected to the temperature sensing piece and the action mechanism is arranged in the guide hole, and a temperature sensing cover is arranged on an opening of the base; the present invention has a reasonable structure and achieves convenient assembly and high safety.

11 Claims, 5 Drawing Sheets

CLOSED-TYPE TEMPERATURE CONTROL DEVICE

TECHNICAL FIELD

This invention generally relates to the technical field of temperature controllers, and more particularly, to a closed-type temperature control device.

BACKGROUND

A temperature sensor is a temperature-sensitive controller having functions including self-action protection, open-circuit maintenance and power-off self-reset. Temperature sensors achieve wide application range and flexible use, capable of protecting the safety of an electrical circuit while avoid damages caused by excessively high operating temperature. A bimetallic-sheet overheating temperature controller is a common temperature controller sold on the market, which operates by sensing the operating temperature of an electrical appliance by means of the contact with heat. In use, the bimetallic sheet deforms to propel a power connection terminal to switch off the circuit, thereby cutting off the power of the electrical appliance.

Chinese patent CN103337410A discloses a bimetallic thermal cutoff device, comprising a bimetallic sheet, a ceramic push rod, an action sheet, a power connection sheet and a power connection terminal, wherein a ceramic base is provided with a mounting cavity, the bimetallic sheet is sealed in the mounting cavity of the ceramic base, an opening of the mounting cavity is provided with a metal temperature sensing mounting support, and the metal temperature sensing support is used for contacting a heat source and transmitting the temperature to the bimetallic sheet. The metal temperature sensing support is an aluminum alloy plate, which is arranged on the opening of the ceramic base and is riveted and fixed to the ceramic base. The aforesaid structure results in a poor sealing performance of the mounting cavity in the ceramic base, complex assembly, and hidden electrical danger of the cutoff device.

Therefore, it is urgent for those skilled in the art to develop a novel temperature controller.

SUMMARY

The purpose of the present invention is to provide a closed-type temperature control device, which has a reasonable structure and achieves convenient assembly and high safety.

To achieve the above purpose, the present invention adopts the following technical solution: a closed-type temperature control device comprises a ceramic box and a base, wherein the base adopts a cavity structure provided with an opening, the base is fixedly connected to the ceramic box, and a guide hole is provided between the base and the ceramic box, wherein a temperature sensing piece is arranged in the base, an action mechanism is arranged in the ceramic box, an action rod connected to the temperature sensing piece and the action mechanism is arranged in the guide hole, and a temperature sensing cover is arranged on an opening of the base.

In another embodiment of the present invention, the temperature sensing cover covers the opening of the base and seals the opening of the base, and a protrusion is formed on an inner side surface of the temperature sensing cover for interacting with both ends of the temperature sensing piece in a positioning manner.

In another embodiment of the present invention, the temperature sensing piece comprises a bimetallic sheet and an energy storage steel sheet, wherein the shape and size of the bimetallic sheet and the energy storage steel sheet are the same, the bimetallic sheet is overlapped on the energy storage steel sheet, and the bimetallic sheet abuts against the temperature sensing cover. Two ends of the action rod respectively abut against the energy storage steel sheet of the temperature sensing piece and the action mechanism.

In another embodiment of the present invention, the ceramic box is a cavity structure with an opening in the bottom surface, and the action mechanism comprises two power connection terminals. Two ends of the cavity of the ceramic box are provided with limiting columns, and the power connection terminals are provided with locking holes. The two power connection terminals are led out from two ends of the ceramic box, and the power connection terminals and the ceramic box are connected by means of the limiting columns and the locking holes in an interacting manner. A connecting elastic piece is movably connected between the two power connection terminals, and an action point for abutting against the action rod is provided on the connecting elastic piece.

In another embodiment of the present invention, two sides of the base are symmetrically provided with fixing plates.

In another embodiment of the present invention, the action rod is internally provided with a fine adjustment mechanism capable of finely adjusting the motion of the action rod.

In another embodiment of the present invention, the fine adjustment mechanism comprises a contact rod, a support plate, a guide rod, a magnetic plate, a first electromagnet and a second electromagnet, wherein the support plate is fixed on an inner wall of the action rod, a lower end of the guide rod is fixed on the magnetic plate, and an upper end of the guide rod passes through the support plate and the second electromagnet and is fixed on an inner wall of the action rod. The second electromagnet is arranged above the magnetic plate, and the first electromagnet is arranged below the magnetic plate. A clamping mechanism is arranged between an outer wall of the contact rod and an inner wall of the action rod, and an upper end of the contact rod is capable of extending out from the action rod to abut against the action mechanism.

In another embodiment of the present invention, the clamping mechanism comprises a plurality of clamping holes arranged up and down at intervals in an inner wall of the action rod and a mounting disc arranged on the contact rod. An elastic rod is arranged on the mounting disc, a clamping ball is arranged on the elastic rod, and the clamping ball interacts with the clamping hole for achieving a clamping effect. A second spring is fixed between the bottom of the contact rod and the top of the supporting plate.

In another embodiment of the present invention, a mounting mechanism is provided on an outer wall of the fixing plate, wherein the mounting mechanism comprises a mounting plate, a backing ring and a bolt. The mounting plate is fixed on the fixing plate, and the mounting plate is provided with a waist hole. A threaded rod of the bolt passes through the backing ring and the waist hole and then is fixed on a mounting member. The mounting plate is provided with a first limiting mechanism for limiting the bolt, and a protective cover is arranged to cover the exterior of the cap of the bolt.

In another embodiment of the present invention, the outer circle of the threaded rod of the bolt is provided with a limiting groove. The first limiting mechanism comprises screw rods, threaded blocks and limiting rods that are symmetrically arranged on the mounting plate, wherein the threaded rod of the screw rod is in threaded connection with one end of the threaded block, the threaded block is slidably arranged in the mounting plate, the other end of the threaded block is fixedly connected to the limiting rod, and the limiting rod extends into the waist hole and interacts with the limiting groove for achieving a clamping effect. The mounting plate is provided with a second limiting mechanism for limiting the screw rod.

In another embodiment of the present invention, the outer circle of the threaded rod of the screw rod is provided with an insertion hole. The second limiting mechanism comprises an insertion rod, wherein a lower end of the insertion rod interacts with the insertion hole for achieving a clamping effect, an upper end of the insertion rod extends out from the mounting plate, and the insertion rod is slidably connected to the mounting plate.

In another embodiment of the present invention, a limiting step is arranged on an outer wall of one end of the insertion rod close to the insertion hole, and a first spring is fixed between the limiting step and an inner wall of the mounting plate.

In another embodiment of the present invention, an inner wall of the protective cover is provided with an elastic clamping ball, an outer wall of the cap of the bolt is provided with a clamping groove, and the elastic clamping ball interacts with the clamping groove for achieving a clamping effect.

Compared with the prior art, the present invention has the following advantages: the temperature sensing piece is fixed in the cavity of the base by the temperature sensing cover, and the temperature sensing cover seals the opening of the base, achieving convenient assembly and high reliability of the overall structure.

In Figures: 1—Ceramic Box, 2—Temperature Sensing Piece, 3—Action Mechanism, 4—Fixing Plate, 5—Guide Hole, 6—Temperature Sensing Cover, 9—Connecting Elastic Piece, 10—Action Point, 11—Base, 12—Mounting Mechanism, 121—Mounting Plate, 122—Waist Hole, 123—Backing Ring, 124—Bolt, 125—Limiting Groove, 126—Insertion Rod, 1261—Limiting Step, 127—Screw Rod, 1271—Insertion Hole, 128—Threaded Block, 129—Limiting Rod, 1210—The First Spring, 1211—Protective Cover, 1212—Elastic Clamping Ball, 1213—Clamping Groove, 13—Fine Adjustment Mechanism, 131—Contact Rod, 132—Support Plate, 133—Guide Rod, 134—Magnetic Plate, 135—The Second Spring, 136—The First Electromagnet, 1361—The Second Electromagnet, 137—Clamping Hole, 138—Mounting Disc, 139—Elastic Rod, 1391—Clamping Ball, 16—Limiting Column, 21—Action Rod, 22—Bimetallic Sheet, 23—Energy Storage Steel Sheet, 31—Power Connection Terminal, 32—Locking Hole.

DETAILED DESCRIPTION

Drawings and embodiments are combined hereinafter to further elaborate the technical solution of the present invention.

Embodiment 1

Figure 1:
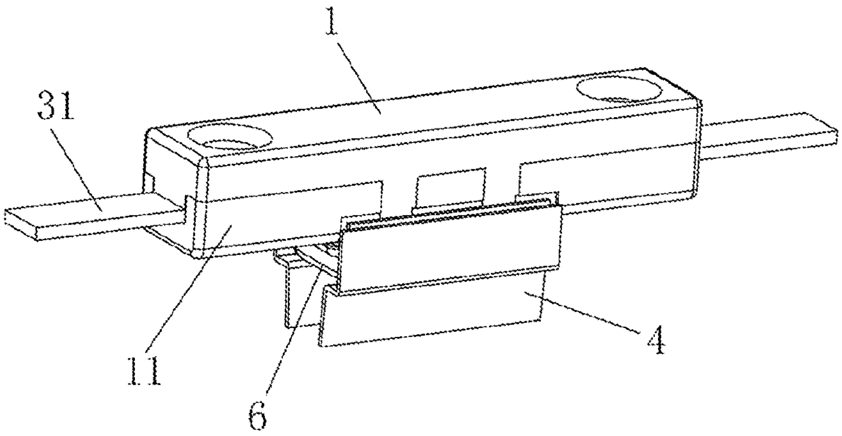
FIG. 1 is a schematic diagram illustrating an overall structure of the closed-type temperature control device in embodiment 1.
Figure 2:
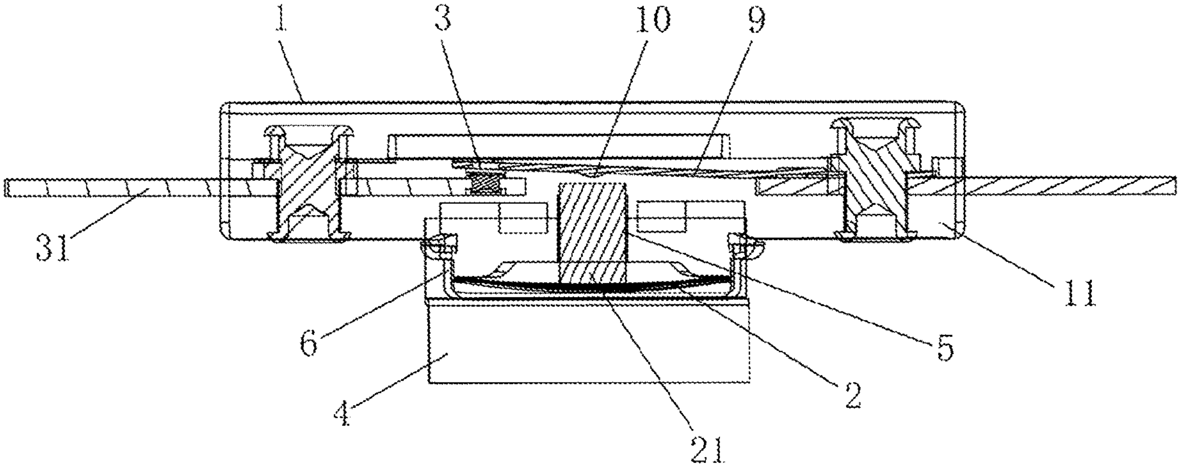
FIG. 2 is a schematic diagram illustrating a sectional view of the closed-type temperature control device in embodiment 1.
Figure 3:
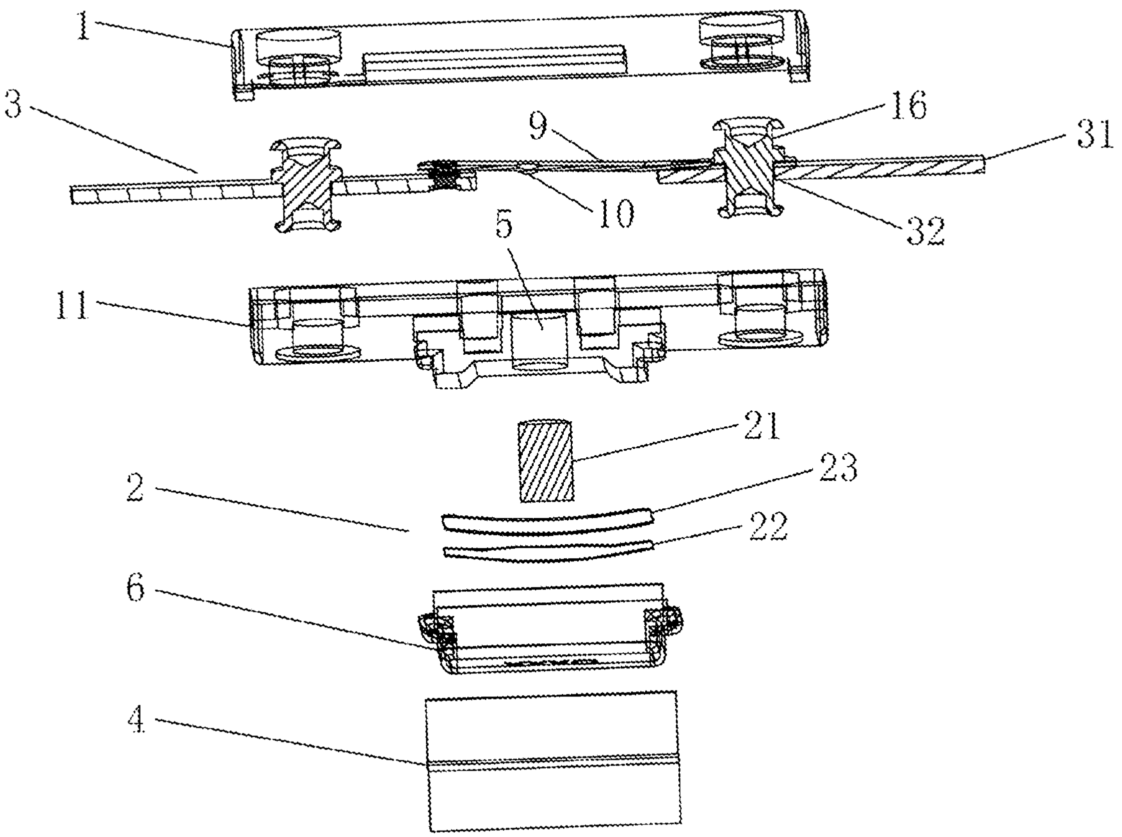
FIG. 3 is a schematic diagram illustrating an explosive view of the closed-type temperature control device in embodiment 1.
Figure 4:
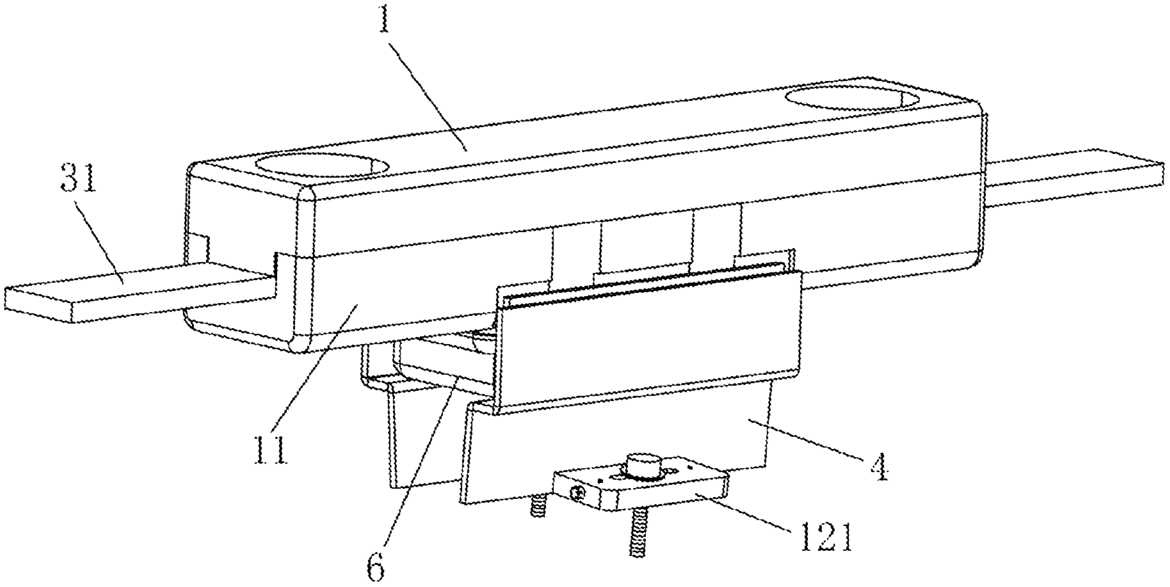
FIG. 4 is a schematic diagram illustrating an overall structure of the closed-type temperature control device in embodiment 2.
Figure 5:
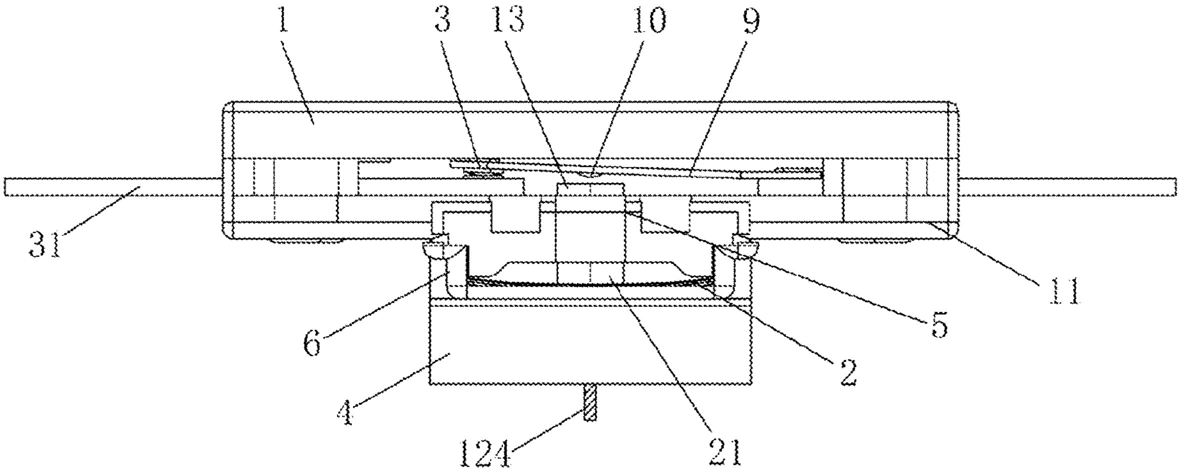
FIG. 5 is a schematic diagram illustrating a sectional view of the closed-type temperature control device in embodiment 2.
Figure 6:
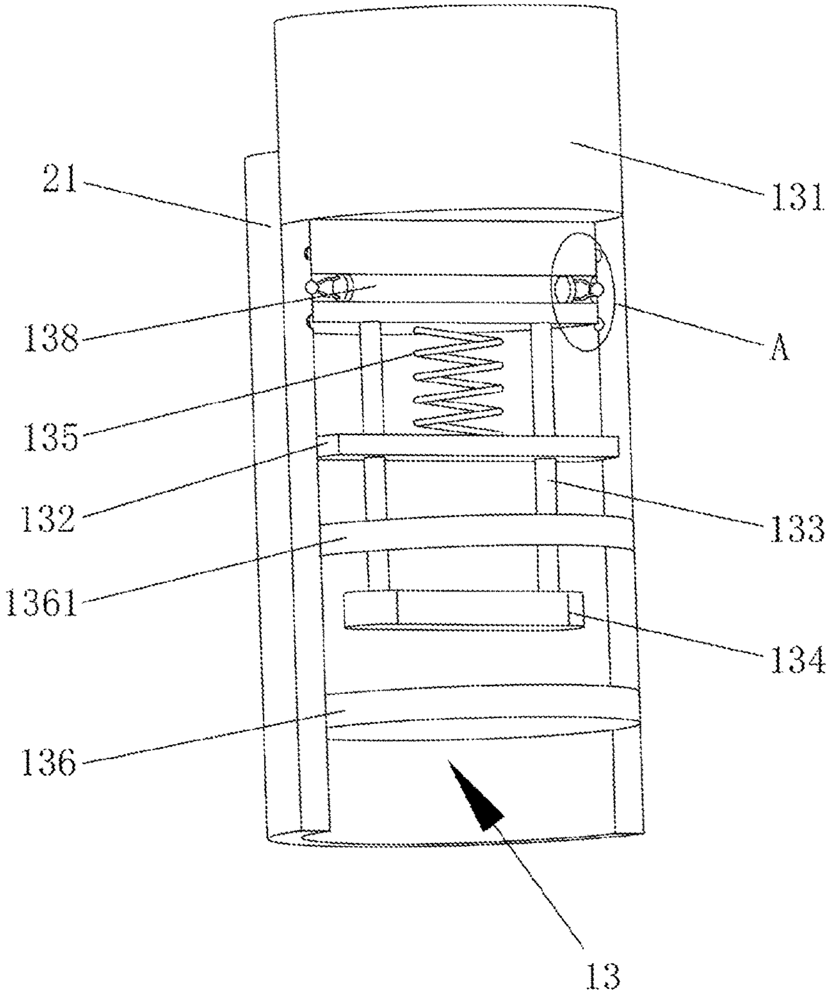
FIG. 6 is a schematic diagram illustrating the fine adjustment mechanism in embodiment 2.
Figure 7:
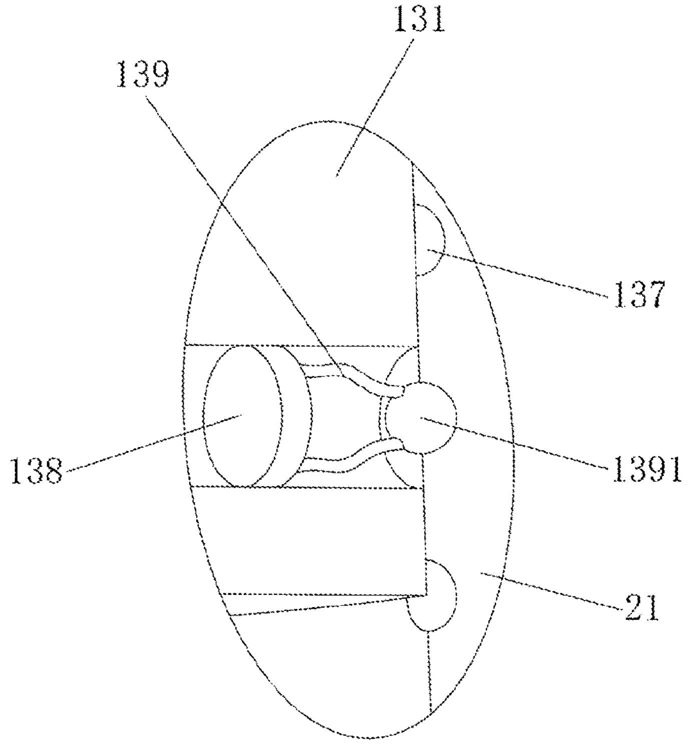
FIG. 7 is a schematic diagram illustrating an enlarged structure of portion A in FIG. 5.

Referring to FIGS. 1-3, the closed-type temperature control device of the present invention comprises a ceramic box 1 and a base 11, wherein the base 11 adopts a cavity structure provided with an opening, the base 11 is fixedly connected to the ceramic box 1, and a guide hole 5 is provided between the base 11 and the ceramic box 1. A temperature sensing piece 2 is arranged in the base 11, an action mechanism 3 is arranged in the ceramic box 1, an action rod 21 connected to the temperature sensing piece 2 and the action mechanism 3 is arranged in the guide hole 5, and a temperature sensing cover 6 is arranged on an opening of the base 11. The action mechanism 3 comprises a power connection sheet, wherein one end of the power connection sheet is fixedly connected to one power connection terminal 31, and the other end of the power connection sheet is detachably connected to the other power connection terminal 31 by means of a connecting elastic piece 9. When the temperature sensing piece 2 senses that there is a sudden temperature rise of the temperature sensing cover, the temperature sensing piece 2 deforms to propel the power connection piece through the action rod 21 to switch off the circuit. The temperature sensing piece 2 of the present invention is sealed in the cavity of the base 11 through the temperature sensing cover 6, the temperature sensing cover 6 and the base 11 define the position of the temperature sensing piece 2, and the cavity of the base 11 allows the temperature sensing piece 2 to deform. The temperature sensing cover 6 seals the opening of the base 11 to form a sealed structure, the ceramic box 1 is made of a high-temperature-resistant ceramic material, the temperature sensing cover 6 is capable of strengthening the structural strength of the base 11, and the sealed structure ensures the electrical safety of the components in the ceramic box 1.

In this embodiment, the temperature sensing cover 6 covers the opening of the base 11 and seals the opening of the base 11, and a protrusion is formed on an inner side surface of the temperature sensing cover 6 for interacting with both ends of the temperature sensing piece 2 in a positioning manner. The temperature sensing piece 2 adopts a rectangular arch bridge sheet structure, and when the temperature of the temperature sensing piece 2 reaches a critical value, the temperature sensing piece 2 deforms to generate a reversed arc surface, so that the center of the arc surface of the temperature sensing piece 2 is able to propel the action rod 21.

In this embodiment, the temperature sensing piece 2 comprises a bimetallic sheet 22 and an energy storage steel sheet 23, wherein the shape and size of the bimetallic sheet 22 and the energy storage steel sheet 23 are the same, the bimetallic sheet 22 is overlapped on the energy storage steel sheet 23, and the bimetallic sheet 22 abuts against the temperature sensing cover 6. Two ends of the action rod 21 respectively abut against the energy storage steel sheet 23 of the temperature sensing piece 2 and the action mechanism 3. Preferably, the temperature sensing piece 2 is provided with an energy storage steel sheet 23, and when the environment temperature exceeds a set value, the bimetallic sheet 22 suddenly deforms to push the center of the arc surface of the energy storage steel sheet 23, so that the energy storage steel sheet 23 is turned over to propel the action mechanism 3 to switch off the circuit. After the circuit is switched off, the temperature drops and the bimetallic sheet 22 automatically resets. At this point, the energy storage steel sheet 23 does not reset by itself. It is necessary to restore the electric appliance by replacing the temperature sensing piece 2 such that the reset is completed. The temperature sensing piece 2 comprises two action pieces with different performances. The material performance of the bimetallic sheet 22 and the energy storage steel sheet 23 may be selected according to the use environment, so that the use range of the temperature control device is significantly widened.

It is worth mentioning that, the temperature sensing piece 2 of the present invention adopts a single cut-off design. Namely, after deforming at a critical temperature, the temperature sensing piece 2 does not reset by itself, and the temperature control device needs to be disassembled for resetting or replacing the temperature sensing piece 2. A groove 15 is used for riveting and fixing the temperature sensing cover 6 on the base 11.

In this embodiment, the ceramic box 1 is a cavity structure with an opening in the bottom surface, and the action mechanism 3 comprises two power connection terminals 31. Two ends of the cavity of the ceramic box 1 are provided with limiting columns 16, and the power connection terminals 31 are provided with locking holes 32. The two power connection terminals 31 are led out from two ends of the ceramic box 1, and the power connection terminals 31 and the ceramic box 1 are connected by means of the limiting columns 16 and the locking holes 32 in an interacting manner. A connecting elastic piece 9 is movably connected between the two power connection terminals, and an action point 10 for abutting against the action rod 21 is provided on the connecting elastic piece 9. The power connection terminal 31 is fixed by the limiting column 16, and the action point 10 is provided on the connecting elastic piece 9. Through adopting this arrangement, the contact effect between the action rod 21 and the connecting elastic piece 9 becomes better, invalid sliding is avoided, and the effect of switching off the circuit is more stable.

In this embodiment, two sides of the base 11 are symmetrically provided with fixing plates 4, and by means of this design, the temperature control device is capable of being fixed in corresponding equipment through the fixing plates, thereby achieving convenient assembly.

Embodiment 2

Referring to FIGS. 4-7, the action rod 21 is internally provided with a fine adjustment mechanism 13 capable of finely adjusting the motion of the action rod 21. The fine adjustment mechanism 13 is arranged in the action rod 21 for allowing the motion of the action rod 21 to be finely adjusted. In this way, the problem relating to the failure of effectively cutting off the power connection sheet caused by the limited motion of the action rod 21 after prolonged use due to the feature influence of the temperature sensing piece 2 during the use of the closed-type temperature control device is solved.

In this embodiment, the fine adjustment mechanism 13 comprises a contact rod 131, a support plate 132, a guide rod 133, a magnetic plate 134, a first electromagnet 136 and a second electromagnet 1361, wherein the support plate 132 is fixed on an inner wall of the action rod 21, a lower end of the guide rod 133 is fixed on the magnetic plate 134, an upper end of the guide rod 133 passes through the support plate 132 and is fixed on the bottom of the contact rod 131, and the guide rod 133 is slidably connected to the support plate 132. The first electromagnet 136 and the second electromagnet 1361 are fixed on an inner wall of the action rod 21 at intervals, the second electromagnet 1361 is arranged above the magnetic plate 134, and the first electromagnet 136 is arranged below the magnetic plate 134. A clamping mechanism is arranged between an outer wall of the contact rod 131 and an inner wall of the action rod 21, and an upper end of the contact rod 131 is capable of extending out from the action rod 21 to abut against the action mechanism 3. When the feature influence of the temperature sensing piece 2 (e.g., when the deformation effect of the temperature sensing piece 2 becomes weak) results in the limited motion of the action rod 21 and the power connection sheet cannot be effectively cut off, the second electromagnet 1361 may be activated to magnetically attract the magnetic plate 134, thereby pulling the magnetic plate 134 and the contact rod 131 fixed to the guide rod 133 to move upwards. In this way, the contact between the contact rod 131 and the power connection sheet is ensured, so that the contact rod 131 is capable of pushing the power connection sheet away to switch off the circuit. Contrarily, the first electromagnet 136 may also be activated to magnetically attract the magnetic plate 134, thereby pulling the magnetic plate 134 and the contact rod 131 fixed to the guide rod 133 to move downwards. In this way, the normal reset of the connecting elastic piece 9 is achieved and the circuit is switched on. In practical use, the guide rod 133 is slidably connected to the support plate 132, and the support plate 132 plays a role in limiting and guiding the guide rod 133, so that the contact rod 131 moves up and down more stably.

In this embodiment, the clamping mechanism comprises a plurality of clamping holes 137 arranged up and down at intervals in an inner wall of the action rod 21 and a mounting disc 138 arranged on the contact rod 131. An elastic rod 139 is arranged on the mounting disc 138, a clamping ball 1391 is arranged on the elastic rod 139, and the clamping ball 1391 interacts with the clamping hole 137 for achieving a clamping effect. A second spring 135 is fixed between the bottom of the contact rod 131 and the top of the supporting plate 132. By means of the interaction between the clamping hole 137 and the clamping ball 1391, the clamping of the action rod 21 when the action rod 21 moves up and down is achieved, allowing the position of the contact rod 131 to be finely controlled. More specifically, referring to FIG. 6, the clamping ball 1391 interacts with one of the clamping holes 137 for achieving the clamping effect, and when the contact rod 131 moves downwards, an inner wall of the action rod 21 presses the clamping ball 1391, so that the elastic rod 139 deforms and is in a compressed state. At this point, the clamping ball 1391 escapes from the clamping hole 137, and when the position of the clamping ball 1391 corresponds to the position of the other clamping hole 137, the elastic rod 139 recovers, and the clamping ball 1391 and the other clamping hole 137 interact with each other to achieve a clamping effect under the return force.

The difference between embodiment 2 and embodiment 1 is that a fine adjustment mechanism 13 capable of finely adjusting the motion of the action rod 21 is additionally arranged in the action rod 21. Other structural features and principles of the temperature control device in embodiment 2 are the same as those in embodiment 1, which are briefly described herein.

Embodiment 3

Figure 8:
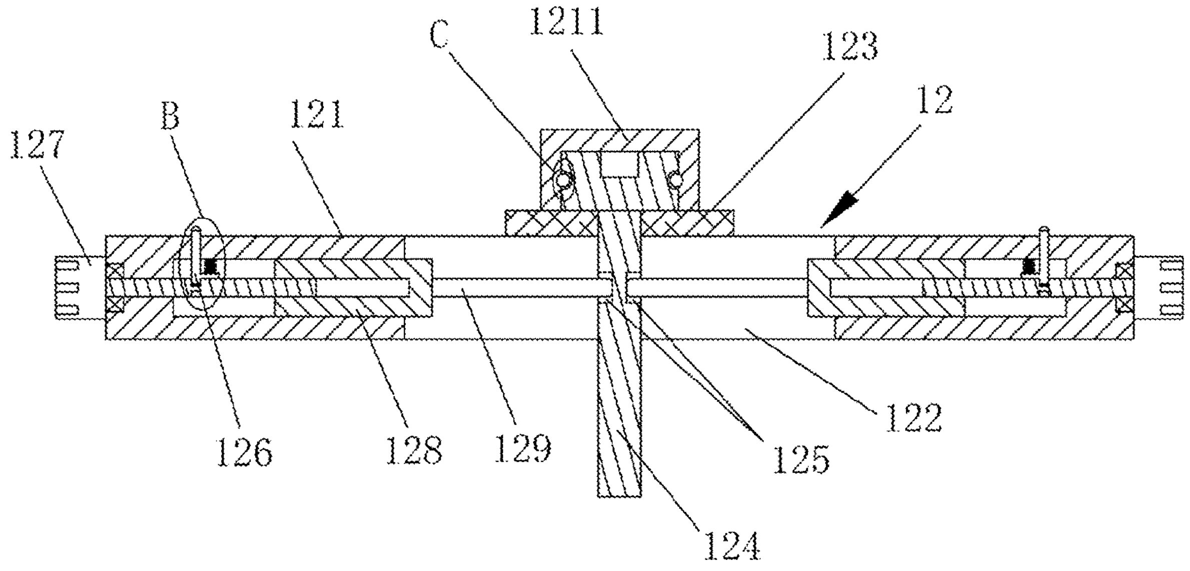
FIG. 8 is a schematic diagram illustrating the mounting mechanism in embodiment 3.
Figure 9:
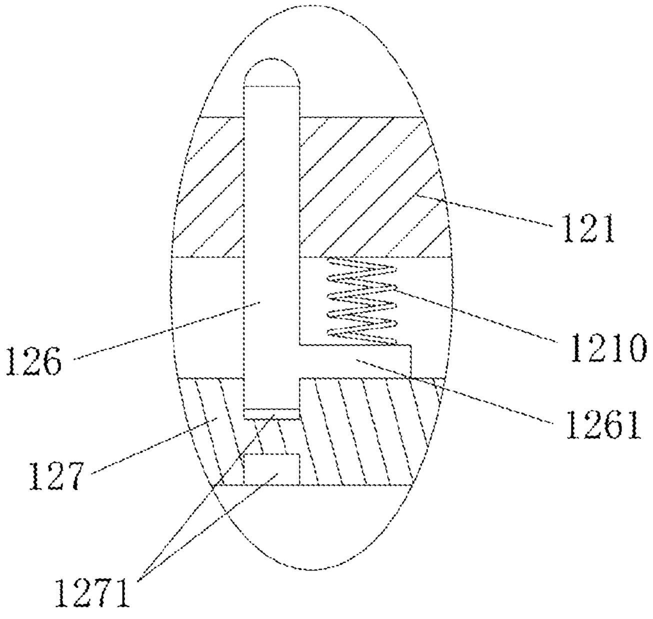
FIG. 9 is a schematic diagram illustrating an enlarged structure of portion B in FIG. 8.
Figure 10:
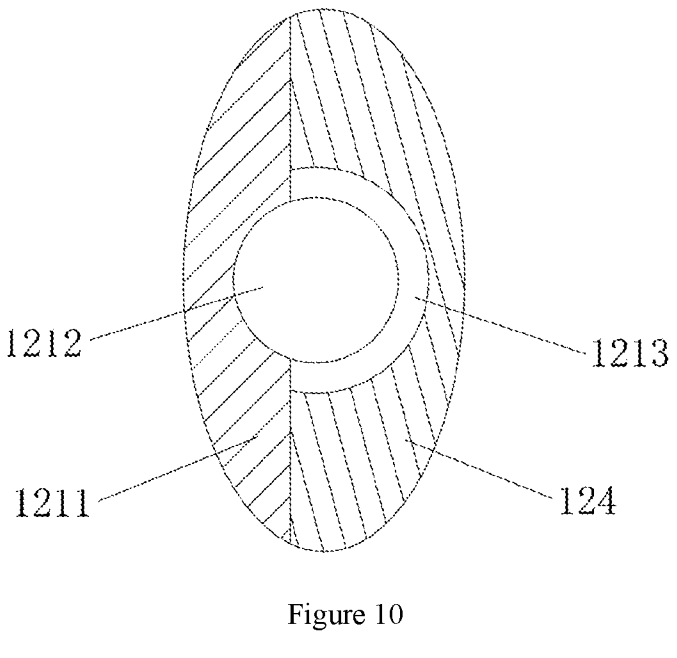
FIG. 10 is a schematic diagram illustrating an enlarged structure of portion C in FIG. 8.

Referring to FIGS. 8-10, a mounting mechanism 12 is provided on an outer wall of the fixing plate 4, wherein the mounting mechanism 12 comprises a mounting plate 121, a backing ring 123 and a bolt 124. The mounting plate 121 is fixed on the fixing plate 4, and the mounting plate 121 is provided with a waist hole 122. A threaded rod of the bolt 124 passes through the backing ring 123 and the waist hole 122 and then is fixed on a mounting member. The mounting plate 121 is provided with a first limiting mechanism for limiting the bolt 124, and a protective cover 1211 is arranged to cover the exterior of the cap of the bolt 124. When fixing the closed-type temperature control device, the threaded rod of the bolt 124 passes through the backing ring 123 and the waist hole 122 and then is fixed to the mounting member, wherein the waist hole 122 is capable of facilitating the positional adjustment of the bolt 124, thereby allowing the bolt 124 and a threaded hole or nut seat in the mounting member to be conveniently assembled. Thus, a convenient operation is achieved. It is worth mentioning that, the mounting plate 121 is provided with a first limiting mechanism for limiting the bolt 124, so that the problem relating to the loosening of the bolt 124 caused by vibration and deflection of the bolt 124 is avoided. Further, the exterior of the cap of the bolt 124 is covered by the protective cover 1211, so that the bolt 124 is protected, the problem relating to the corrosion of the bolt 124 is avoided, and the functional life of the bolt 124 is prolonged.

In this embodiment, the outer circle of the threaded rod of the bolt 124 is provided with a limiting groove 125. The first limiting mechanism comprises screw rods 127, threaded blocks 128 and limiting rods 129 that are symmetrically arranged on the mounting plate 121, wherein the threaded rod of the screw rod 127 is in threaded connection with one end of the threaded block 128, the threaded block 128 is slidably arranged in the mounting plate 121, the other end of the threaded block 128 is fixedly connected to the limiting rod 129, and the limiting rod 129 extends into the waist hole 122 and interacts with the limiting groove 125 for achieving a clamping effect. The mounting plate 121 is provided with a second limiting mechanism for limiting the screw rod 127. After the bolt 124 is tightly screwed in the threaded hole of the mounting member, the threaded block 128 is capable of being propelled by the screw rod 127 to slide relative to the mounting plate 121, thereby propelling the limiting rod 129 to extend into the waist hole 122 and interact with the limiting groove 125 for achieving a clamping effect. Thus, the problem relating to the loosening of the bolt 124 caused by the vibration and deflection of the bolt 124 is prevented. It is worth mentioning that, during disassembly, before rotating the bolt 124, the screw rod 127 needs to be rotated first, thereby propelling the threaded block 128 such that the limiting rod 129 is propelled to be disengaged from the limiting groove 125.

In this embodiment, the outer circle of the threaded rod of the screw rod 127 is provided with an insertion hole 1271. The second limiting mechanism comprises an insertion rod 126, wherein a lower end of the insertion rod 126 interacts with the insertion hole 1271 for achieving a clamping effect, an upper end of the insertion rod 126 extends out from the mounting plate 122, and the insertion rod 126 is slidably connected to the mounting plate 122. Through adopting the aforesaid arrangement, when the screw rod 127 rotates to propel the threaded block 128, the limiting rod 129 is propelled by the threaded block 128 to extend into the limiting groove 125 for achieving a clamping effect, and the lower end of the insertion rod 126 also interacts with the insertion hole 1271 for achieving a clamping effect, so that the clamping of the screw rod 127 is realized, and the problem relating to the vibration and deflection of the screw rod 127 is prevented.

In this embodiment, a limiting step 1261 is arranged on an outer wall of one end of the insertion rod 126 close to the insertion hole 1271, and a first spring 1210 is fixed between the limiting step 1261 and an inner wall of the mounting plate 122. Through adopting the aforesaid design, by means of the elastic force of the first spring 1210, the insertion rod 126 is capable of being always located in the insertion hole 1271, and when the screw rod 127 needs to be rotated, the insertion rod 126 needs to be pulled out from the insertion hole 1271. At this point, the first spring 1210 is in a compressed state, and after the rotation of the screw rod 127 stops, the insertion rod 126 is released, and the insertion rod 126 is inserted into the insertion hole 1271 again under the elastic force of the first spring 1210.

In this embodiment, an inner wall of the protective cover 1211 is provided with an elastic clamping ball 1212, an outer wall of the cap of the bolt 124 is provided with a clamping groove 1213, and the elastic clamping ball 1212 interacts with the clamping groove 1213 for achieving a clamping effect. Through adopting the aforesaid design, when the protective cover 1211 covers the outer wall of the cap of the bolt 124, a better covering effect is achieved. More specifically, when being covered by the protective cover 1211, the outer wall of the cap of the bolt 124 squeezes the elastic clamping ball 1212 such that the elastic clamping ball deforms, and under the action of force, the elastic clamping ball 1212 moves along the outer wall of the cap of the bolt 124. When the position of the elastic clamping ball 1212 corresponds to the position of the clamping groove 1213, the elastic clamping ball 1212 deforms and is squeezed into the clamping groove 1213, thereby realizing the clamping between the protective cover 1211 and the cap of the bolt 124.

The difference between embodiment 3 and embodiment 1 is that a mounting mechanism is additionally arranged on an outer wall of the fixing plate 4. Other structural features and principles of the temperature control device in embodiment 3 are the same as those in embodiment 1, which are briefly described herein.

The above are merely preferred embodiments of the present invention, and therefore, all equivalent changes or modifications made according to the structures, features and principles described in the scope defined by the claims of the present invention shall fall into the protection scope of the present invention.

The invention claimed is:

1. A closed-type temperature control device, comprising:

a ceramic box, and a base, wherein the base adopts a cavity structure provided with an opening, the base is fixedly connected to the ceramic box, and a guide hole is provided between the base and the ceramic box, wherein a temperature sensing piece is arranged in the base, an action mechanism is arranged in the ceramic box, an action rod connected to the temperature sensing piece and the action mechanism is arranged in the guide hole, and a temperature sensing cover is arranged on an opening of the base, wherein the action rod is internally provided with a fine adjustment mechanism capable of finely adjusting the motion of the action rod, wherein the fine adjustment mechanism comprises:

a contact rod, a support plate, a guide rod, a magnetic plate, a first electromagnet and a second electromagnet, wherein the support plate is fixed on an inner wall of the action rod, a lower end of the guide rod is fixed on the magnetic plate, and an upper end of the guide rod passes through the support plate and the second electromagnet and is fixed on an inner wall of the action rod, wherein the second electromagnet is arranged above the magnetic plate, and the first electromagnet is arranged below the magnetic plate, wherein a clamping mechanism is arranged between an outer wall of the contact rod and an inner wall of the action rod, and an upper end of the contact rod is capable of extending out from the action rod to abut against the action mechanism.

2. The closed-type temperature control device of claim 1, wherein the temperature sensing cover covers the opening of the base and seals the opening of the base, and a protrusion is formed on an inner side surface of the temperature sensing cover for interacting with both ends of the temperature sensing piece in a positioning manner.

3. The closed-type temperature control device of claim 1, wherein the temperature sensing piece comprises:

a bimetallic sheet and an energy storage steel sheet, wherein the shape and size of the bimetallic sheet and the energy storage steel sheet are the same, the bimetallic sheet is overlapped on the energy storage steel sheet, and the bimetallic sheet abuts against the temperature sensing cover, wherein two ends of the action rod respectively abut against the energy storage steel sheet of the temperature sensing piece and the action mechanism.

4. The closed-type temperature control device of claim 1, wherein the ceramic box is a cavity structure with an opening in the bottom surface, and the action mechanism comprises:

two power connection terminals, wherein two ends of the cavity of the ceramic box are provided with limiting columns, and the power connection terminals are provided with locking holes, wherein the two power connection terminals are led out from two ends of the ceramic box, and the power connection terminals and the ceramic box are connected by means of the limiting columns and the locking holes in an interacting manner, wherein a connecting elastic piece is movably connected between the two power connection terminals, and an action point for abutting against the action rod is provided on the connecting elastic piece.

5. The closed-type temperature control device of claim 1, wherein two sides of the base are symmetrically provided with fixing plates.

6. The closed-type temperature control device of claim 1, wherein the clamping mechanism comprises:

a plurality of clamping holes arranged up and down at intervals in an inner wall of the action rod and a mounting disc arranged on the contact rod, wherein an elastic rod is arranged on the mounting disc, a clamping ball is arranged on the elastic rod, and the clamping ball interacts with the clamping hole for achieving a clamping effect, wherein a second spring is fixed between the bottom of the contact rod and the top of the supporting plate.

7. The closed-type temperature control device of claim 5, wherein a mounting mechanism is provided on an outer wall of the fixing plate, wherein the mounting mechanism comprises:

a mounting plate, a backing ring and a bolt, wherein the mounting plate is fixed on the fixing plate, and the mounting plate is provided with a waist hole, wherein a threaded rod of the bolt passes through the backing ring and the waist hole and then is fixed on a mounting member, wherein the mounting plate is provided with a first limiting mechanism for limiting the bolt, and a protective cover is arranged to cover the exterior of the cap of the bolt.

8. The closed-type temperature control device of claim 7, wherein the outer circle of the threaded rod of the bolt is provided with a limiting groove, wherein the first limiting mechanism comprises:

screw rods, threaded blocks and limiting rods that are symmetrically arranged on the mounting plate, wherein the threaded rod of the screw rod is in threaded connection with one end of the threaded block, the threaded block is slidably arranged in the mounting plate, the other end of the threaded block is fixedly connected to the limiting rod, and the limiting rod extends into the waist hole and interacts with the limiting groove for achieving a clamping effect, wherein the mounting plate is provided with a second limiting mechanism for limiting the screw rod.

9. The closed-type temperature control device of claim 8, wherein the outer circle of the threaded rod of the screw rod is provided with an insertion hole, wherein the second limiting mechanism comprises:

an insertion rod, wherein a lower end of the insertion rod interacts with the insertion hole for achieving a clamping effect, an upper end of the insertion rod extends out from the mounting plate, and the insertion rod is slidably connected to the mounting plate.

10. The closed-type temperature control device of claim 9, wherein a limiting step is arranged on an outer wall of one end of the insertion rod close to the insertion hole, and a first spring is fixed between the limiting step and an inner wall of the mounting plate.

11. The closed-type temperature control device of claim 7, wherein an inner wall of the protective cover is provided with an elastic clamping ball, an outer wall of the cap of the bolt is provided with a clamping groove, and the elastic clamping ball interacts with the clamping groove for achieving a clamping effect.

* * * * *